May 20, 1941.     G. A. ROE     2,242,895
LEVER HANDLE FOR RURAL MAILBOXES, OR DOORS, OR LIDS
Filed July 19, 1939
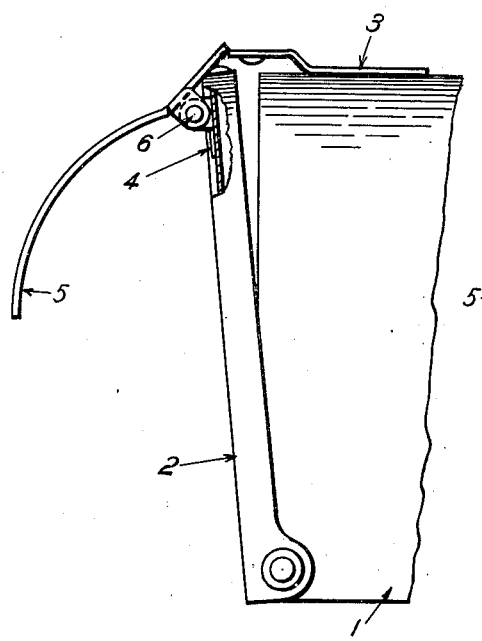
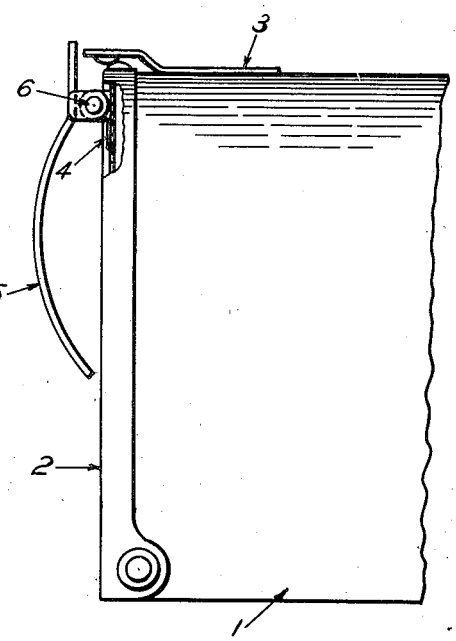
INVENTOR.
Grant A. Roe.

Patented May 20, 1941

2,242,895

UNITED STATES PATENT OFFICE 2,242,895

LEVER HANDLE FOR RURAL MAILBOXES, OR DOORS, OR LIDS

Grant Arthur Roe, Middletown, N. Y.

Application July 19, 1939, Serial No. 285,357

2 Claims. (Cl. 292—254)

The invention relates to improvements in rural mail boxes, but may be used anywhere on doors or lids which are hard to open; and the object of the improvement is to bring a great amount of pulling or lifting power on the door or lid to be opened with a slight pull of the handle, so that a door or lid which has become covered with ice and frozen, or which sticks because of rust, or which is heavy because of its weight, may be easily opened by means of the lever principle used in this handle.

One form of the invention is illustrated in the accompanying drawing of a rural mail box, in which Figure 1 shows the handle in operation, and Figure 2 shows the lid of the box closed and the normal position of the handle when not in operation.

In Figure 1, 1 is a fragmentary vertical elevation of a rural mail box, 2 is the lid of the box, 3 is a wiper bar securely fastened to the top of the box and extending forward to a point beyond the front side of the lid, 4 is a bracket securely fastened to the upper portion of the lid near the top, 5 is a lever type vertical handle pivoted to the bracket 4 at point 6. At the extended end of the wiper bar, and on the under portion thereof, there is a small head extending downward which engages a like head on the top of the lid, and extending upward, when the lid is moved into closed position, thus securely holding the lid in a closed position as shown in Figure 2. The upper and shorter arm of the lever is arranged directly opposite the front end of the wiper bar. The lower and longer arm of the lever forms a handle which is grasped and pulled forward to effect the opening of the lid. When the lower arm of the lever is pulled forward, the lever is rocked, by means of pivot 6, with the result that the upper arm of the lever contacts with the wiper bar. This causes pressure to be applied to bracket 4, which is securely fastened to the lid, in such a manner as to move the lid into open position. Because of the leverage provided a slight or moderate pull of the lever handle is sufficient to break any seal, caused by ice or rust, between the lid and the body of the box.

Figure 2 shows the box with the lid closed and the normal position of the lever handle when not in use, and with the shorter arm of the lever just clearing the end of the wiper bar.

Having described my invention and illustrated its operation by means of Figures 1 and 2; therefore, I claim:

1. A fastening and releasing device for a closure for a receptacle comprising a fastener including a double acting spring wiper bar secured to the receptacle and having means to engage a cooperating part on the closure to yieldingly retain the latter in closed position, said wiper bar having an extension projecting a short distance beyond the closure when in closed position, a forcing lever having a long and short arm securely fastened to said closure by means of a bracket and pivot, and located in alignment with said wiper bar, the long arm of said lever constituting an operating handle, the short arm being adapted to engage the wiper bar extension whereby force applied to said handle will cause said lever to rock on said pivot until the short arm of said lever comes in contact with the above mentioned wiper bar whereupon initial pressure will cause release of the closure fastener and continued pressure force the closure open.

2. The structure defined in claim 1 wherein the lever is so disposed with relation to the closure that the force applied to the long arm of the lever is in the direction of the opening movement of the closure whereupon the operating force imposed upon the lever will also be transmitted through its pivot to the closure to combine the forces to cooperate in opening the closure.

GRANT ARTHUR ROE.